US012074621B2

(12) United States Patent
Shen

(10) Patent No.: US 12,074,621 B2
(45) Date of Patent: Aug. 27, 2024

(54) ANTI-INTERFERENCE CONTROL APPARATUS AND METHOD, TERMINAL DEVICE, AND READABLE STORAGE MEDIUM

(71) Applicant: ZTE Corporation, Shenzhen (CN)

(72) Inventor: Shaowu Shen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/025,424

(22) PCT Filed: Aug. 5, 2021

(86) PCT No.: PCT/CN2021/110920
§ 371 (c)(1),
(2) Date: Mar. 9, 2023

(87) PCT Pub. No.: WO2022/062714
PCT Pub. Date: Mar. 31, 2022

(65) Prior Publication Data
US 2023/0327691 A1 Oct. 12, 2023

(30) Foreign Application Priority Data
Sep. 28, 2020 (CN) .......................... 202011043478.4

(51) Int. Cl.
*H04B 1/10* (2006.01)
*H04B 17/20* (2015.01)
(Continued)

(52) U.S. Cl.
CPC ......... *H04B 1/1027* (2013.01); *H04B 17/204* (2023.05); *H04B 17/345* (2015.01); *H04W 24/04* (2013.01); *H04W 24/08* (2013.01)

(58) Field of Classification Search
CPC .. H04B 1/1027; H04B 17/345; H04B 17/204; H04W 24/04; H04W 24/08
See application file for complete search history.

(56) References Cited

U.S. PATENT DOCUMENTS 9,161,332 B2 * 10/2015 Nagata ................ H04W 64/003
2019/0059064 A1 * 2/2019 Ghosh ............... H04W 56/0005
(Continued)

FOREIGN PATENT DOCUMENTS

| CN | 107276599 A | 10/2017 |
| CN | 108847906 A | 11/2018 |

(Continued)

OTHER PUBLICATIONS

Extended European Search Report dated Feb. 21, 2024 in connection with European Application No. 21871091.1.

(Continued)

*Primary Examiner* — Freshteh N Aghdam
(74) *Attorney, Agent, or Firm* — Wolf, Greenfield & Sacks, P.C.

(57) ABSTRACT

An anti-interference control apparatus and method, a terminal device, and a computer-readable storage medium are disclosed. The anti-interference control apparatus may include: an interference detection assembly, connected to a millimeter wave antenna module, and configured for determining, according to a channel quality parameter from the millimeter wave antenna module, whether a millimeter wave signal emitted by the millimeter wave antenna module is interfered; an interference source detection assembly, connected to the interference detection assembly, and configured for detecting location information of an interference source when the interference detection assembly determines that the millimeter wave signal emitted by the millimeter wave antenna module is interfered; and a control assembly, connected to the interference source detection assembly, and configured for performing, according to the location information from the interference source detection assembly, anti-interference processing corresponding to the location (Continued)

information. The terminal device includes the millimeter wave antenna module.

20 Claims, 5 Drawing Sheets

(51) Int. Cl.
*H04B 17/345* (2015.01)
*H04W 24/04* (2009.01)
*H04W 24/08* (2009.01)

(56) References Cited

U.S. PATENT DOCUMENTS

2019/0372219 A1* 12/2019 Schneider ............. G01S 7/4818
2019/0372737 A1* 12/2019 Hao ........................ H04B 1/46

FOREIGN PATENT DOCUMENTS

| CN | 109407088 A | 3/2019 | |
|----|----|----|----|
| CN | 109765529 A | 5/2019 | |
| CN | 110971250 A | 4/2020 | |
| EP | 3 041 298 B1 | 6/2017 | |
| EP | 3 442 140 A1 | 2/2019 | |
| EP | 2 974 439 B1 | 5/2019 | |
| GB | 2 420 464 A | 5/2006 | |
| JP | 2008-113136 A | 5/2008 | |
| JP | 2010-147519 A | 7/2010 | |
| JP | 2015-046713 A | 3/2015 | |
| JP | 2015-073242 A | 4/2015 | |
| JP | 2018-100929 A | 6/2018 | |
| JP | 2020-041845 A | 3/2020 | |
| WO | WO-2017065372 A1 * | 4/2017 | ........... G01S 7/2813 |

OTHER PUBLICATIONS

Lim et al., Interference mitigation using random antenna selection in millimeter wave beamforming system. EURASIP J. on Wireless Communications and Networking. 2017;87: 16 pages. https://doi.org/10.1186/s13638-017-0868-5.
International Search Report and Written Opinion for International Application No. PCT/CN2021/110920, mailed Nov. 3, 2021.
Office Action for Japanese Application No. 2023-515656, mailed Feb. 6, 2024.

* cited by examiner

ANTI-INTERFERENCE CONTROL APPARATUS AND METHOD, TERMINAL DEVICE, AND READABLE STORAGE MEDIUM

CROSS-REFERENCE TO RELATED APPLICATIONS

This application is a national stage filing under 35 U.S.C. § 371 of international application number PCT/CN2021/110920, filed Aug. 5, 2021, which claims priority to Chinese patent application No. 202011043478.4, filed Sep. 28, 2020. The contents of these applications are incorporated herein by reference in their entirety.

TECHNICAL FIELD

Embodiments of the present disclosure relate to, but not limited to, the technical field of communication, and in particular, to an anti-interference control apparatus and method, a terminal device, and a computer-readable storage medium.

BACKGROUND

With the development of 5G communication technologies, some terminal devices have begun to use millimeter wave for communication. Compared with conventional communication methods, the communication effect of millimeter wave is better. However, due to the short wavelength of millimeter wave, the diffraction ability of millimeter wave is not strong. Therefore, the penetration ability of millimeter wave is relatively weak, making millimeter wave vulnerable to communication interference caused by external objects. Hence, how to resist interference has become an important subject for 5G millimeter wave technologies. At present, in some cases, when a millimeter wave communication device is used for communication, an anti-interference operation can be achieved by beam management on the millimeter wave antenna or the base station side. However, such adjustment mode is monotonous and has limitations, and cannot achieve a desirable anti-interference effect for millimeter wave communication devices.

SUMMARY

The following is a summary of the subject matter set forth in the description. This summary is not intended to limit the scope of protection of the claims.

Embodiments of the present disclosure provide an anti-interference control apparatus and method, a terminal device, and a computer-readable storage medium.

In accordance with a first aspect of the present disclosure, an embodiment provides an anti-interference control apparatus, which is arranged in a terminal device including a millimeter wave antenna module. The anti-interference control apparatus includes: an interference detection assembly, connected to the millimeter wave antenna module, and configured for determining, according to a channel quality parameter from the millimeter wave antenna module, whether a millimeter wave signal emitted by the millimeter wave antenna module is interfered; an interference source detection assembly, connected to the interference detection assembly, and configured for acquiring location information of an interference source in response to the interference detection assembly determining that the millimeter wave signal emitted by the millimeter wave antenna module is interfered; and a control assembly, connected to the interference source detection assembly, and configured for performing, according to the location information from the interference source detection assembly, anti-interference processing corresponding to the location information.

In accordance with a second aspect of the present disclosure, an embodiment further provides an anti-interference control method, which is applied to an anti-interference control apparatus. The anti-interference control apparatus is arranged in a terminal device including a millimeter wave antenna module. The anti-interference control apparatus includes an interference detection assembly and an interference source detection assembly, and the millimeter wave antenna module, the interference detection assembly and the interference source detection assembly are connected in sequence. The anti-interference control method includes: controlling the interference detection assembly to acquire a channel quality parameter from the millimeter wave antenna module; controlling the interference source detection assembly to acquire location information of an interference source in response to the interference detection assembly determining, according to the channel quality parameter, that a millimeter wave signal emitted by the millimeter wave antenna module is interfered; and acquiring the location information from the interference source detection assembly, and performing, according to the location information, anti-interference processing corresponding to the location information.

In accordance with a third aspect of the present disclosure, an embodiment further provides an anti-interference control apparatus. The apparatus includes a memory, a processor, and a computer program stored in the memory and executable by the processor which, when executed by the processor, causes the processor to perform the anti-interference control method in accordance with the second aspect.

In accordance with a fourth aspect of the present disclosure, an embodiment further provides a terminal device. The device includes the anti-interference control apparatus in accordance with the first aspect or the anti-interference control apparatus in accordance with the third aspect.

In accordance with a fifth aspect of the present disclosure, an embodiment further provides a computer-readable storage medium, storing a computer-executable instruction which, when executed by a processor, causes the processor to perform the anti-interference control method in accordance with the second aspect.

Additional features and advantages of the present disclosure will be set forth in the description which follows, and in part will be obvious from the description, or may be learned by the practice of the present disclosure. The objects and other advantages of the present disclosure can be realized and obtained by the structures particularly pointed out in the description, claims, and accompanying drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure.

DETAILED DESCRIPTION

To make the objects, technical schemes, and advantages of the present disclosure clear, the present disclosure is described in further detail in conjunction with accompanying drawings and examples. It should be understood that the specific embodiments described herein are merely used for illustrating the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish between similar objects, and are not necessarily used to describe a specific sequence or a precedence order.

Embodiments of the present disclosure provide an anti-interference control apparatus and method, a terminal device, and a computer-readable storage medium. The interference detection assembly can determine whether the millimeter wave signal emitted by the millimeter wave antenna module is interfered, so that the anti-interference control apparatus can accurately determine an interference status of the millimeter wave antenna module under current conditions to determine whether anti-interference processing needs to be performed for the millimeter wave antenna module. When it is determined that the millimeter wave signal is interfered, the interference source detection assembly can detect the location information of the interference source, so that the user can learn the cause of the interference with the millimeter wave signal. Then the anti-interference processing corresponding to the location information can be performed based on the control assembly. In other words, anti-interference adjustment can be performed correspondingly according to an actual scenario and application environment, so as to solve the interference caused by the interference source to the millimeter wave signal. Therefore, the anti-interference capability of the millimeter wave antenna module can be improved, and accordingly the throughput performance of the terminal device can be further improved.

The embodiments of the present disclosure will be further described in detail below in conjunction with the accompanying drawings.

Figure 1:
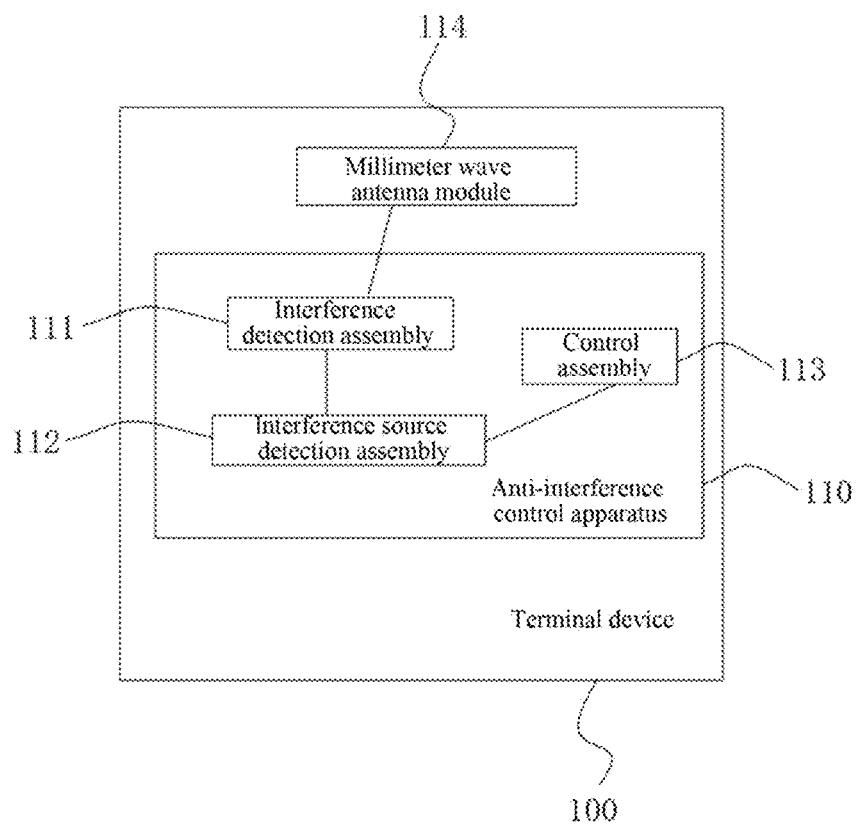
FIG. 1 is a schematic diagram of an anti-interference control apparatus according to an embodiment of the present disclosure.

As shown in FIG. 1, FIG. 1 is a schematic diagram of an anti-interference control apparatus 110 according to an embodiment of the present disclosure.

In the example of FIG. 1, the anti-interference control apparatus 110 is arranged in a terminal device 100 including a millimeter wave antenna module 114. The anti-interference control apparatus 110 includes: an interference detection assembly 111, an interference source detection assembly 112, and a control assembly 113.

The interference detection assembly 111 is connected to the millimeter wave antenna module 114, and configured for determining, according to a channel quality parameter from the millimeter wave antenna module 114, whether a millimeter wave signal emitted by the millimeter wave antenna module 114 is interfered.

The interference source detection assembly 112 is connected to the interference detection assembly 111, and configured for acquiring location information of an interference source in response to the interference detection assembly 111 determining that the millimeter wave signal emitted by the millimeter wave antenna module 114 is interfered.

The control assembly 113 is connected to the interference source detection assembly 112, and configured for performing, according to the location information from the interference source detection assembly 112, anti-interference processing corresponding to the location information.

In an embodiment, the interference detection assembly 111 can determine whether the millimeter wave signal emitted by the millimeter wave antenna module 114 is interfered, so that the anti-interference control apparatus 110 can accurately determine an interference status of the millimeter wave antenna module 114 under current conditions to determine whether anti-interference processing needs to be performed for the millimeter wave antenna module 114. When it is determined that the millimeter wave signal is interfered, the interference source detection assembly 112 can detect the location information of the interference source, so that the user can learn the cause of the interference with the millimeter wave signal. Then the anti-interference processing corresponding to the location information can be performed based on the control assembly 113. In other words, anti-interference adjustment can be performed correspondingly according to an actual scenario and application environment, so as to solve the interference caused by the interference source to the millimeter wave signal. Therefore, the anti-interference capability of the millimeter wave antenna module 114 can be improved, and accordingly the throughput performance of the terminal can be further improved.

In an embodiment, the control assembly 113 can perform closed-loop adjustment according to the location information that is fed back in real time. To be specific, the control assembly 113 continues to monitor relevant information of the millimeter wave antenna module 114 subjected to the anti-interference processing. If there is still an interference source that affects the millimeter wave antenna module 114, i.e., if the interference detection assembly 111 still determines that the millimeter wave signal emitted by the millimeter wave antenna module 114 is interfered, the control assembly 113 continues to perform the anti-interference processing corresponding to the location information, until the millimeter wave signal emitted by the millimeter wave antenna module 114 is no longer interfered.

In an embodiment, after acquiring the channel quality parameter from the millimeter wave antenna module 114, the interference detection assembly 111 can detect a signal interference state and a wireless transmission interference state of the millimeter wave antenna module 114 according to the channel quality parameter. The signal interference state is mainly used to characterize interference received by the millimeter wave antenna module 114 in the process of emitting an antenna signal. The wireless transmission interference state is mainly used to characterize interference received by the millimeter wave antenna module 114 in the process of transmitting the antenna signal. The two interference states can both be determined by the channel quality parameter.

In an embodiment, the channel quality parameter may be, but not limited to: Reference Signal Receiving Power (RSRP), Block Error Ratio (BLER), Signal Noise Ratio (SNR), Received Signal Strength Indicator (RSSI), etc. The above specific indicators are well known to those having ordinary skills in the art, and therefore will not be described in detail herein.

In an embodiment, whether the millimeter wave signal emitted by the millimeter wave antenna module 114 is interfered can be determined according to a preset first channel quality parameter threshold. To be specific, in response to the channel quality parameter from the millimeter wave antenna module 114 being greater than the first channel quality parameter threshold, the interference detection assembly 111 determines that the millimeter wave signal emitted by the millimeter wave antenna module 114 is interfered. As can be seen, whether the millimeter wave signal is interfered can be obtained simply and effectively by numerical comparison. On the contrary, if the channel quality parameter of the millimeter wave antenna module 114 is not greater than the first channel quality parameter threshold, the interference detection assembly 111 determines that the millimeter wave signal emitted by the millimeter wave antenna module 114 is not interfered. Correspondingly, when the millimeter wave signal is not interfered, the interference source detection assembly 112 and the control assembly 113 are not required to perform corresponding operations.

In an embodiment, the millimeter wave antenna module 114 may be an independent millimeter wave antenna or an antenna module integrating a millimeter wave antenna and a radio frequency front-end device, and may be distributed on the top, frame or corner areas of the terminal device 100. When the millimeter wave antenna module 114 is an array antenna, which may include four, eight, or any other number of antenna array combinations, orthogonal polarized radiation in different forms can be achieved.

In an embodiment, when more than one millimeter wave antenna module 114 is arranged, interference may occur between millimeter wave signals emitted by different millimeter wave antenna modules 114, i.e., an interference offset may occur in the beam directions of different millimeter wave signals. In this case, the interference detection assembly 111 may be configured for detecting a beam interference status of any millimeter wave signal. Similarly, if only one millimeter wave antenna module 114 is arranged, and there may be other beams within a space radiation range of the millimeter wave antenna module 114 (for example, there are a plurality of terminal devices 100), the interference detection assembly 111 may also be configured for detecting whether another beam within the space radiation range interferes with the millimeter wave signal emitted by the millimeter wave antenna module 114.

In an embodiment, the interference source may be, but not limited to, the user (including some parts of the user's body, such as fingers, body, and the like), an obstacle or other interference beams. It should be noted that the user, the obstacle or other interference beams may all cause interference in the process of millimeter wave signal emitting by the millimeter wave antenna module 114, and may also cause interference in the process of millimeter wave signal transmitting (for example, the user or the obstacle blocks between the millimeter wave antenna module 114 and a base station).

In an embodiment, the location information acquired by the interference source detection assembly 112 may be physical coordinate information of the user (including some parts of the user's body) or the obstacle, exiting direction information of the beam causing interference, or the like, which will not be limited in this embodiment.

In an embodiment, the terminal device 100 further includes a millimeter wave modem module, which is connected to the millimeter wave antenna module 114, and can be configured for implementing emission, reception, and modulation and demodulation of the millimeter wave signal. The millimeter wave modem module is not limited to a millimeter wave radio frequency chip module, a millimeter wave digital signal processing unit, etc.

In addition, another embodiment of the present disclosure further provides an anti-interference control apparatus. The interference source detection assembly includes a radiator and a radiation signal detection component connected to the radiator. In response to the interference detection assembly determining that the millimeter wave signal emitted by the millimeter wave antenna module is interfered, the radiation signal detection component emits a radiation signal through the radiator, and in the case of acquiring a feedback signal from the radiator, determines the location information of the interference source according to the feedback signal, where the feedback signal is obtained from the reflection of the radiation signal by the interference source.

In an embodiment, since the radiation signal can be reflected, the feedback signal reflected by the interference source can be acquired after the radiator emits the radiation signal, so that two signals, namely, the radiation signal and the feedback signal, can be determined. By comparing the difference between the two signals, impact caused by the location of the interference source on the corresponding signal can be determined, and then the location information of the interference source can be determined. It can be seen that in this process, it is not necessary to acquire the location information of the interference source based on the millimeter wave antenna module, thereby improving the detection accuracy. In addition, no complex algorithm is involved, and a measurement can be implemented only through information exchange. Therefore, the detection is more convenient and effective.

In an embodiment, the interference source detection assembly further includes a photography assembly, which is capable of performing image detection in the vicinity of the terminal device to determine the location information of the user or the obstacle. The photography assembly may include an unlimited number of cameras or similar photography devices. For example, a camera is arranged on each of a front face and a rear face of the terminal device. The front camera is configured for detecting user blocking, and the rear camera is configured for detecting obstacle blocking behind the terminal device. In other words, the location information of the interference source can be acquired. The operating principles of the foregoing embodiments are described below using specific examples.

Example One

Figure 2:
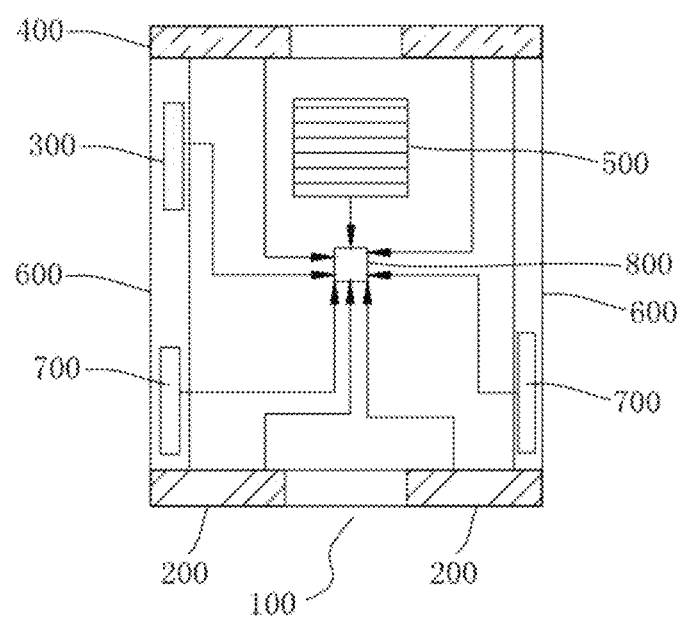
FIG. 2 is a schematic diagram of a terminal device according to an embodiment of the present disclosure.

The terminal device 100 shown in FIG. 2 further includes other types of antennas in addition to the millimeter wave antenna module. The other types of antennas may be used as the radiator for emitting the radiation signal, and include, for example, a primary antenna 200 (which may be a cellular antenna in 2G, 3G or 4G), a Bluetooth wireless communication antenna 300, a Global Positioning System (GPS) receiving antenna 400, a near-field communication induction antenna 500, and the like. Any one or more of the antennas are used as the radiator. Alternatively, any one or more metal units in the terminal device 100 may be used as the radiator, for example, a metal frame 600 in the terminal device 100 shown in FIG. 2 or a metal coil 700 on a PVB main board in the terminal device 100. In addition, the radiation signal detection component may be a detection chip for reducing the specific absorption rate (an index for measuring electromagnetic radiation of an antenna to a human body), as shown in FIG. 2, the chip is provided with a charge sensing circuit 800 for determining the location information of the interference source. The charge sensing circuit 800 can be connected to any radiator.

Figure 3:
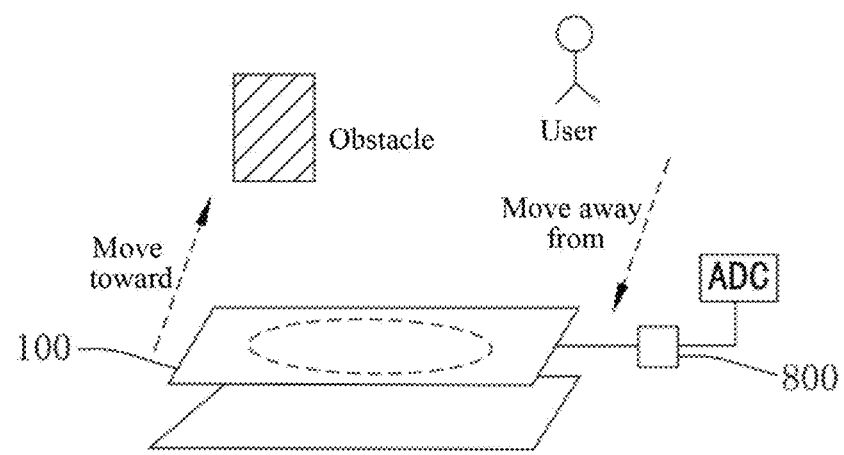
FIG. 3 is a schematic diagram of acquiring location information of an interference source by an anti-interference control apparatus according to an embodiment of the present disclosure.

The antennas and the metal units may be connected by shielding protection coaxial lines or microstrip lines of a certain width and length. Connecting lines are arranged at channel positions of the charge sensing circuit 800. Because each of the units forms a certain vertical projection area with a to-be-contacted object at a corresponding angle, the surface with which or the angle at which the to-be-contacted object is contacted can be determined through the reflection and collection of induced charges on the projection area in this direction and the to-be-contacted object. To be specific, the detection chip uses the corresponding antennas and metal units of the terminal device 100 as a reference plane (i.e., as a probe array), and uses a plane, for example, the human body or the object, contacted by the terminal device 100 as a sensing plane. By measuring a tiny change in the charge value between the two planes, the detection chip can determine whether the corresponding area of the terminal device 100 leaves the sensing plane. The principle is as follows: as shown in FIG. 3, a charge bar circuit in the radiator in the terminal device 100 continuously radiates a small amount of charge signal outward. When a radiated charge signal encounters an obstacle or a user (i.e., an interference source), part of the radiated charge signal is reflected back. The number of reflected charges is related to the distance and projection area (i.e., a dashed line area in the terminal device 100 shown in FIG. 3) of the interference source. The distance of the interference source may be adjusted by moving the terminal device 100 toward or away from the interference source as shown in FIG. 3. Finally, the charge sensing circuit 800 collects the number of the reflected charges, which is converted into a corresponding digital signal value by an Analog To Digital Converter (ADC) and stored in a corresponding register. The number of induced charges and the detecting distance are controlled by a sensitivity gain parameter, and is inversely proportional to the test distance and directly proportional to the detected projection area. Therefore, the test distance between the radiator and the interference source and the projection area can be determined based on the change in the number of charges, and then the location information of the interference source can be acquired based on the test distance and the projection area.

It should be noted that, because different obstacles have different conductivities and dielectric constants due to the fact that the material that contacts the terminal device may be a metal material, wooden product, glass material, a leather product, cloth, hand, plastic or air with different temperatures and humidity, when the obstacle and the corresponding antennas or metal units of the terminal device form an induction range, the reflectance for a small amount of charges varies. Therefore, before detection, typical values of a charge reflection model and corresponding fluctuation ranges may be set in advance, and stored as thresholds. In this way, the distance relationship between the radiator and the obstacle of any material can be determined according to the difference in the amount of induced charges detected, i.e., the location information of the interference source can be obtained.

Figure 4:
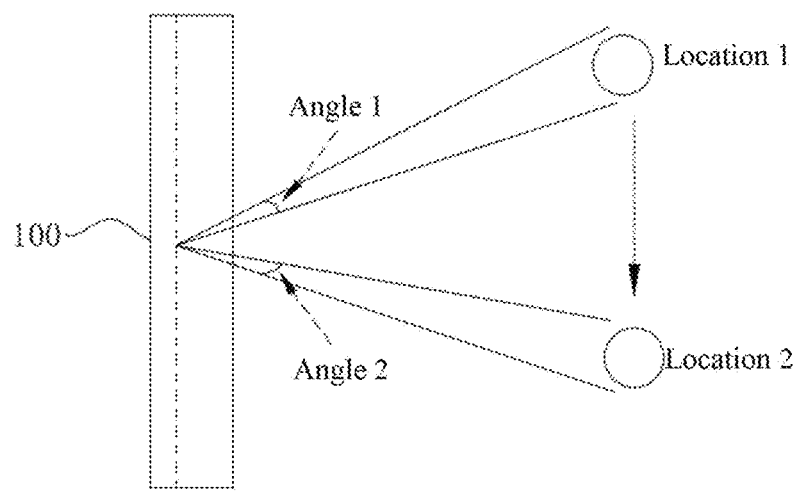
FIG. 4 is a schematic diagram of acquiring location information of an interference source by an anti-interference control apparatus according to another embodiment of the present disclosure.

As shown in FIG. 4, FIG. 4 is a schematic diagram of acquiring location information of an interference source by an anti-interference control apparatus according to another embodiment of the present disclosure.

In the example of FIG. 4, based on the same principle as the foregoing embodiments, when the user moves from location 1 to location 2, the angle of antenna scanning is changed from angle 1 to angle 2, and the charge sensing circuit can detect a reflected signal, and therefore can detect the presence of the user in this direction.

In addition, another embodiment of the present disclosure further provides an anti-interference control apparatus, where the terminal device further includes an information prompt component connected to the control assembly. In response to the control assembly acquiring the location information from the interference source detection assembly, the control assembly determines grip adjustment guidance information and/or three-dimensional beam information according to the location information, and prompts a user with the grip adjustment guidance information and/or the three-dimensional beam information through the information prompt component.

In this embodiment, after the location information from the interference source detection assembly is acquired, i.e., the location information of the interference source has been determined, the control assembly can provide the corresponding grip adjustment guidance information and/or three-dimensional beam information according to the location information, and prompt the corresponding grip adjustment guidance information and/or three-dimensional beam information to the user through the information prompt component, so that the user can perform corresponding adjustment according to the guidance, to eliminate or weaken the interference caused by the interference source. It should be noted that grip adjustment and three-dimensional beam adjustment are set from different references, i.e., in practice, only one or both of the grip adjustment and three-dimensional beam may be adopted for adjustment, but the anti-interference effects obtained by using only one or both of the grip adjustment and three-dimensional beam are the same. Therefore, "and/or" is adopted in the related description in this embodiment.

In an embodiment, the information prompt component may be a speaker or a display. When the information prompt component is a speaker, the grip adjustment guidance information and three-dimensional beam information are played by voice. When the information prompt component is a display, the user is guided by a video or image to perform the grip adjustment.

Figure 5:
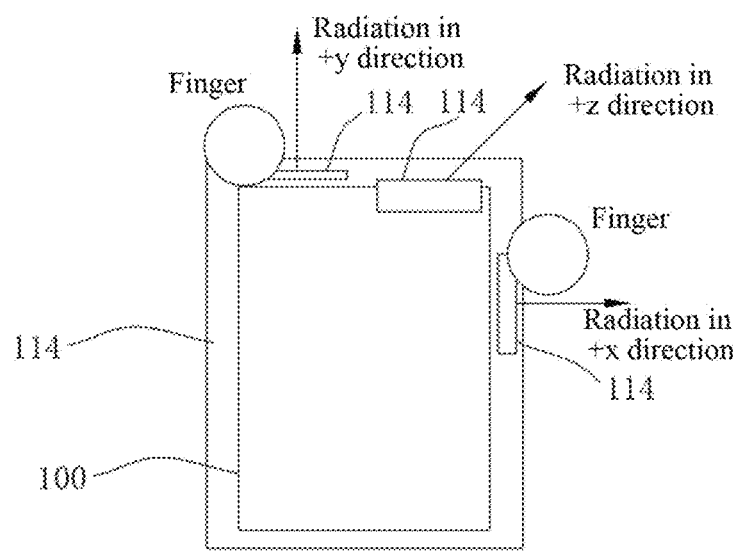
FIG. 5 is a schematic diagram of performing anti-interference processing corresponding to the location information by the anti-interference control apparatus according to an embodiment of the present disclosure.

In an embodiment, the grip adjustment guidance information is mainly applicable to situations where the interference is caused by user gripping of the terminal device. In this case, the user is instructed to adjust the grip to avoid interference. Examples are given below to illustrate the operating principles of this embodiment. As shown in FIG. 5, FIG. 5 is a schematic diagram of performing anti-interference processing corresponding to the location information by the anti-interference control apparatus according to an embodiment of the present disclosure.

Example Two

As shown in FIG. 5, during the use of the terminal device 100, when the user's finger or palm contacts the position corresponding to the mobile phone frame, a certain blocking effect is formed, and most of the millimeter wave signal is blocked or attenuated. For example, if a region at the edge of the mobile phone is gripped by a finger or palm, and the gripping position is near the millimeter wave antenna module 114, the grip causes interference (as shown in FIG. 5, a radiation signal of a single millimeter wave antenna module 114 is partially blocked due to the blocking effect of fingers, i.e., the radiation signal can only be radiated in some directions). After acquiring the grip information, the control assembly can determine the corresponding grip adjustment information according to the grip, and prompt the grip adjustment information on the information prompt component, for example, by displaying. For example, contacts at different positions may be displayed in different colors or patterns, for example, may be expressed by fixed colors. For example, red represents a contact point with poor signal strength, black represents a contact point with unaffected signal strength, and green represents a contact point with enhanced signal strength. Therefore, the information prompt component may display the contact points with different colors on the terminal device 100, so as to provide the user with a grip guidance prompt.

In addition, if the current wireless signal strength of the terminal device is poor, the signal transmission of the antenna may be interfered. In this case, it is detected that the current grip by the user does not match the current wireless mode of the terminal device. Similarly, the information prompt component displays the color status of a current contact point and prompts an optimal contact position. After receiving the prompt, the user can change the grip or the finger contact point to reduce the interference with the current antenna signal, thereby improving the communication quality of the antenna signal.

In an embodiment, the terminal device further includes a beam storage and management module, configured for implementing storage and management of beam information of the millimeter wave antenna module, involving a beam scanning range, beam spacing, a beam omnidirectional cumulative distribution function value, an effective radiation power of any beam, etc. Beam is a state presented by the millimeter wave antenna module during operation. The millimeter wave antenna module uses a beam as a basic unit for wireless connection. Correspondingly, each beam radiates a certain power. The millimeter wave antenna module may include a plurality of beams. These beams may be of different types, and may be distributed at different positions in spatial orientations. In addition, the beams may also be divided into two categories, one being under V polarization and the other being under H polarization, which may respectively correspond to different millimeter wave antenna modules. It can be seen that with the beam storage and management module, the beam information of the millimeter wave antenna module obtained in advance by testing can be mapped to an ID of any beam information in the form of a parameter table, and stored in the corresponding module. In addition, the beam information may be divided into different regions corresponding to different millimeter wave radiation ranges, for convenient comparison and retrieval by the control assembly.

Figure 6:
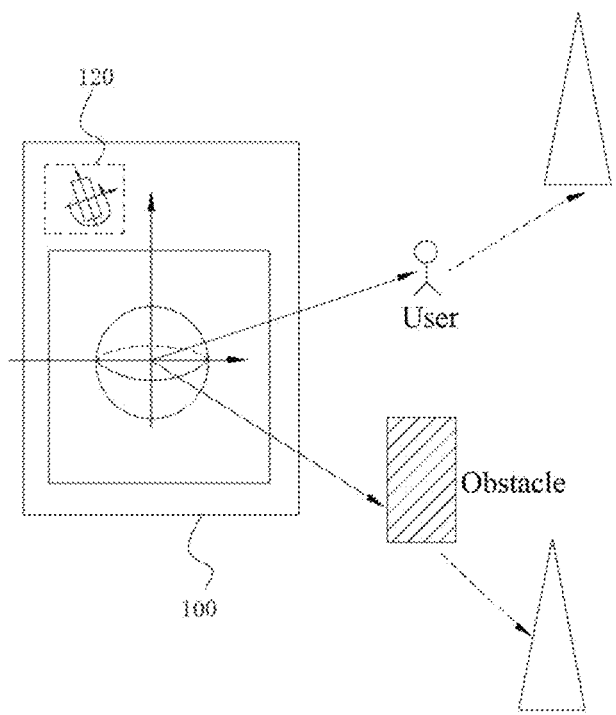
FIG. 6 is a schematic diagram of performing anti-interference processing corresponding to the location information by the anti-interference control apparatus according to another embodiment of the present disclosure.

In an embodiment, the three-dimensional beam information is used to represent a current beam outgoing status of the millimeter wave antenna module, i.e., a current status of interference with an outgoing beam by an obstacle, so as to guide the user to adjust the position of the terminal device to avoid the interference of the obstacle to the outgoing beam. Examples are given below to illustrate the operating principles of this embodiment. As shown in FIG. 6, FIG. 6 is a schematic diagram of performing anti-interference processing corresponding to the location information by the anti-interference control apparatus according to another embodiment of the present disclosure.

Example Three

As shown in FIG. 6, the information prompt component 120 adopts a visualized operation guidance interface, which can provide the user with a visualized direction and angle switching guidance, and may be opened or closed by selecting relevant settings on a User Interface (UI) of the terminal device 100 to call up a corresponding window, so as to feed back a current three-dimensional beam scanning status, e.g., which beams are scanning, a scanning angle/range of the corresponding beam, etc. Beams in different directions are displayed in different colors or patterns. For example, a green scanning area indicates a high antenna signal strength, and a red scanning area indicates a weak antenna signal strength. Alternatively, the strength of the antenna signal can be directly calculated based on numerical values to provide a corresponding location guidance (for example, a location guidance of the terminal device 100 shown in FIG. 6). As can be seen, as shown in FIG. 4, if an angle mismatch occurs between the current location or control mode of the user and the base station, or if the terminal device is blocked by an obstacle, the beam scanning range is exceeded, i.e., a beam scanning blind area appears. Consequently, normal communication cannot be carried out, resulting in reduced throughput of millimeter wave communication. In this case, a three-dimensional beam adjustment operation is required. For example, the user adjusts the orientation and location of the user following the guidance interface. In this way, 360° rotational adjustment in the horizontal direction and 360° longitudinal adjustment in the vertical direction are implemented to realize three-dimensional beam adjustment, so as to eliminate or weaken the interference caused by the interference source.

In addition, another embodiment of the present disclosure further provides an anti-interference control apparatus, where the terminal device further includes a driving assembly respectively connected to the millimeter wave antenna module and the control assembly. In response to the control assembly acquiring the location information from the interference source detection assembly, the control assembly controls the driving assembly according to the location information to adjust a location of the millimeter wave antenna module in the terminal device.

In an embodiment, the location of the millimeter wave antenna module in the terminal device can be directly adjusted by the driving assembly, i.e., relative positions of the millimeter wave antenna module and the interference source can be changed, so as to realize the anti-interference adjustment for the millimeter wave antenna module.

In an embodiment, the driving assembly may be any type of driving component, for example, a motor, an electrical motor, and the like and may be selected by those having ordinary skills in the art according to an actual situation, which is not limited herein.

Figure 7:
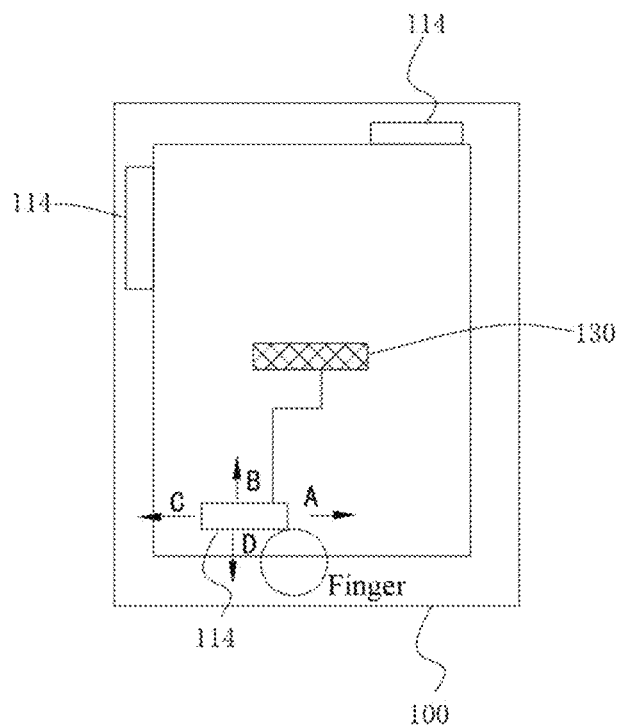
FIG. 7 is a schematic diagram of performing anti-interference processing corresponding to the location information by the anti-interference control apparatus according to another embodiment of the present disclosure.

Examples are given below to illustrate the operating principles of the foregoing embodiments, As shown in FIG. 7, FIG. 7 is a schematic diagram of performing anti-interference processing corresponding to the location information by the anti-interference control apparatus according to another embodiment of the present disclosure.

Example Four

When the orientation of the terminal device and the location of the user cannot be adjusted, or the current number of millimeter wave antenna modules is too small to realize a large-area coverage in the strong signal range in all directions, and the beam is in the millimeter wave radiation blind area, the location of the millimeter wave antenna module can be adjusted through the driving assembly, to switch the millimeter wave antenna module to the millimeter wave radiation blind area for operation. For example, assuming that a millimeter wave antenna module has a main lobe radiation range of 90°, the millimeter wave antenna module needs to be switched and adjusted in four directions in order to achieve 360° omnidirectional communication between the terminal device and the base station.

As shown in FIG. 7, the current location of the millimeter wave antenna module 114 faces toward direction A and is blocked by the user's finger, and a rotary motor 130 is connected to the millimeter wave antenna module 114, the direction of the millimeter wave antenna module 114 can be adjusted to directions B, C and D, respectively. Every adjacent two of the directions A, B, C and D are spaced by 90 degrees. The rotary motor 130 can be implemented by reusing a vibration motor in the terminal device 100, which can rotate clockwise or counterclockwise in a non-vibrating operating state, to drive the millimeter wave antenna module 114 to adjust the direction, so that the millimeter wave radiation range of the millimeter wave antenna module 114 can cover the radiation blind area, i.e., can eliminate or weaken the interference caused by the interference source.

Figure 8:
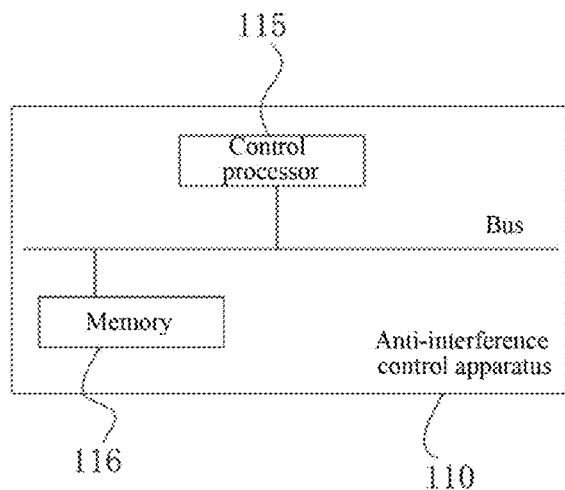
FIG. 8 is a schematic diagram of an anti-interference control apparatus according to another embodiment of the present disclosure.

Referring to FIG. 8, FIG. 8 is a schematic diagram of an anti-interference control apparatus 110 according to another embodiment of the present disclosure.

As shown in FIG. 8, the anti-interference control apparatus 110 includes: one or more control processors 115 and one or more memories 116. One control processor 115 and one memory 116 are taken as an example in FIG. 8.

The control processor 115 and the memory 116 may be connected by a bus or in other ways. Connection by a bus is taken as an example in FIG. 8.

The memory 116, as a non-transitory computer-readable storage medium, may be configured for storing a non-transitory software program and a non-transitory computer-executable program. In addition, the memory 116 may include a high-speed random access memory, and may also include a non-transitory memory, e.g., at least one magnetic disk storage device, flash memory device, or other non-transitory solid-state storage device. In some implementations, the memory 116 may include remote memories located remotely from the control processor 115, and the remote memories 116 may be connected to the control processor 115 via a network. Examples of the network include, but are not limited to, the Internet, an intranet, a local area network, a mobile communication network, and combinations thereof.

The anti-interference control apparatus 110 and application scenarios described in the embodiments of the present disclosure are for the purpose of illustrating the technical schemes of the embodiments of the present disclosure clear, and do not constitute a limitation on the technical schemes provided in the embodiments of the present disclosure. Those having ordinary skills in the art can know that with the evolution of the anti-interference control apparatus 110 and the emergence of new application scenarios, the technical schemes provided in the embodiments of the present disclosure are also applicable to similar technical problems.

Those having ordinary skills in the art may understand that the anti-interference control apparatus 110 shown in FIG. 8 do not constitute a limitation to the embodiments of the present disclosure, and more or fewer components than those shown in the figure may be included, or some components may be combined, or a different component arrangement may be used.

In the anti-interference control apparatus 110 shown in FIG. 8, the control processor 115 may execute an instruction stored in the memory 116 to implement the corresponding anti-interference control method.

Based on the structure of the anti-interference control apparatus 110, various embodiments of the anti-interference control method of the present disclosure are proposed.

Figure 9:
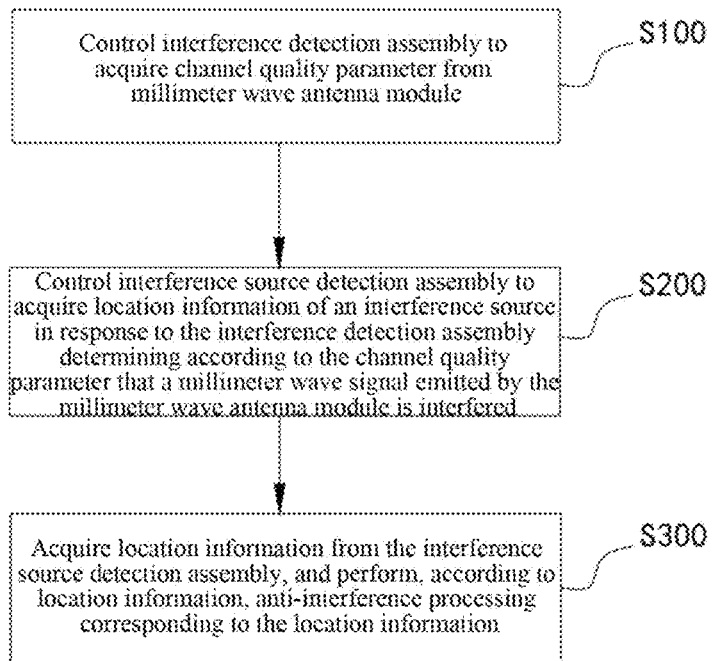
FIG. 9 is a flowchart of an anti-interference control method according to an embodiment of the present disclosure.

As shown in FIG. 9, FIG. 9 is a flowchart of an anti-interference control method according to an embodiment of the present disclosure. The anti-interference control method may be applied to the anti-interference control apparatus in the embodiment shown in FIG. 1 or FIG. 8. The anti-interference control method includes, but not limited to, the following steps S100 to S300.

At S100, the interference detection assembly is controlled to acquire a channel quality parameter from the millimeter wave antenna module.

At S200, the interference source detection assembly is controlled to acquire location information of an interference source in response to the interference detection assembly determining according to the channel quality parameter that a millimeter wave signal emitted by the millimeter wave antenna module is interfered.

At S300, the location information from the interference source detection assembly is acquired, and anti-interference processing corresponding to the location information is performed according to the location information.

In an embodiment, the interference detection assembly can acquire the channel quality parameter from the millimeter wave antenna module to determine an interference status of the millimeter wave antenna module. When it is determined that the millimeter wave signal is interfered, the interference source detection assembly can detect the location information of the interference source, so that the user can learn the cause of the interference with the millimeter wave signal. Then the anti-interference processing corresponding to the location information can be performed based on the control assembly. In other words, anti-interference adjustment can be performed correspondingly according to an actual scenario and application environment, so as to solve the interference caused by the interference source to the millimeter wave signal. Therefore, the anti-interference capability of the millimeter wave antenna module can be improved, and accordingly the throughput performance of the terminal can be further improved.

It should be noted that the anti-interference control method in this embodiment and the anti-interference control apparatus in the foregoing embodiments belong to the same inventive concept, and therefore, for specific implementations of the anti-interference control method in this embodiment, reference may be made to the specific embodiments of the anti-interference control apparatus in the foregoing embodiments. To avoid redundancy, the specific implementations of the anti-interference control method in this embodiment will not be described in detail herein.

Figure 10:
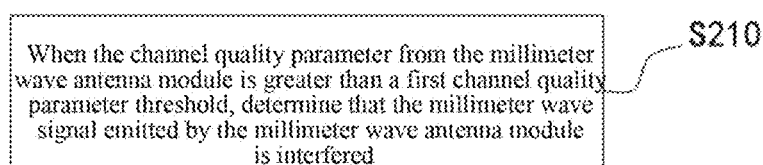
FIG. 10 is a flowchart of an anti-interference control method according to another embodiment of the present disclosure.

As shown in FIG. 10, FIG. 10 is a flowchart of an anti-interference control method according to an embodiment of the present disclosure. Determining according to the channel quality parameter whether the millimeter wave signal emitted by the millimeter wave antenna module is interfered in S200 includes, but not limited to a step S210.

At S210, when the channel quality parameter from the millimeter wave antenna module is greater than a first channel quality parameter threshold, it is determined that the millimeter wave signal emitted by the millimeter wave antenna module is interfered.

In an embodiment, whether the millimeter wave signal emitted by the millimeter wave antenna module 114 is interfered can be determined by the interference detection assembly by comparing a preset first channel quality parameter threshold with the current channel quality parameter of the millimeter wave antenna module. As can be seen, whether the millimeter wave signal is interfered can be obtained simply and effectively by numerical comparison. On the contrary, if the channel quality parameter of the millimeter wave antenna module is not greater than the first channel quality parameter threshold, the interference detection assembly can determine that the millimeter wave signal emitted by the millimeter wave antenna module is not interfered. Correspondingly, when the millimeter wave signal is not interfered, the interference source detection assembly and the control assembly are not required to perform corresponding operations.

It should be noted that the anti-interference control method in this embodiment and the anti-interference control apparatus in the foregoing embodiments belong to the same inventive concept, and therefore, for specific implementations of the anti-interference control method in this embodiment, reference may be made to the specific embodiments of the anti-interference control apparatus in the foregoing embodiments. To avoid redundancy, the specific implementations of the anti-interference control method in this embodiment will not be described in detail herein.

Figure 11:
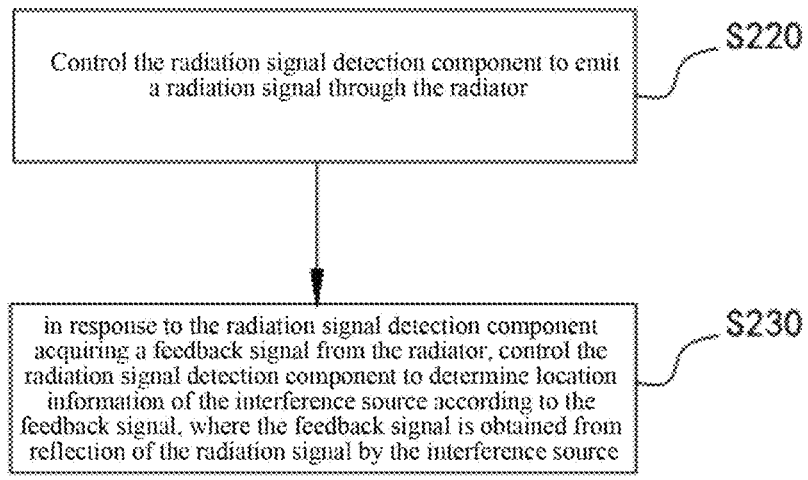
FIG. 11 is a flowchart of an anti-interference control method according to another embodiment of the present disclosure.

As shown in FIG. 11, FIG. 11 is a flowchart of an anti-interference control method according to an embodiment of the present disclosure. The anti-interference control method may also be applied to the anti-interference control apparatus shown in FIG. 4. To be specific, the interference source detection assembly includes a radiator and a radiation signal detection component connected to the radiator. Correspondingly, controlling the interference source detection assembly to acquire the location information of the interference source in S200 includes, but not limited to, steps S220 to S230.

At S220, the radiation signal detection component is controlled to emit a radiation signal through the radiator.

At S230, in response to the radiation signal detection component acquiring a feedback signal from the radiator, the radiation signal detection component is controlled to determine the location information of the interference source according to the feedback signal, where the feedback signal is obtained from the reflection of the radiation signal by the interference source.

In an embodiment, since the radiation signal can be reflected, the feedback signal reflected by the interference source can be acquired after the radiator emits the radiation signal, so that two signals, namely, the radiation signal and the feedback signal, can be determined. By comparing the difference between the two signals, impact caused by the location of the interference source on the corresponding signal can be determined, and then the location information of the interference source can be determined. It can be seen that in this process, it is not necessary to acquire the location information of the interference source based on the millimeter wave antenna module, thereby improving the detection accuracy. In addition, no complex algorithm is involved, and a measurement can be implemented only through information exchange. Therefore, the detection is more convenient and effective.

It should be noted that the anti-interference control method in this embodiment and the anti-interference control apparatus in the foregoing embodiments belong to the same inventive concept, and therefore, for specific implementations of the anti-interference control method in this embodiment, reference may be made to the specific embodiments of the anti-interference control apparatus in the foregoing embodiments. To avoid redundancy, the specific implementations of the anti-interference control method in this embodiment will not be described in detail herein.

Figure 12:
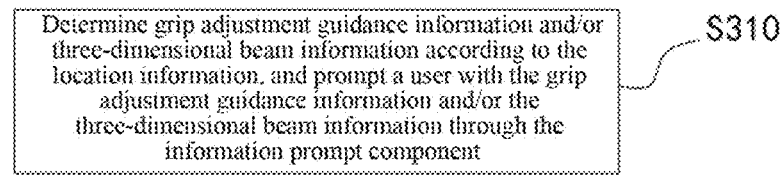
FIG. 12 is a flowchart of an anti-interference control method according to another embodiment of the present disclosure.

As shown in FIG. 12, FIG. 12 is a flowchart of an anti-interference control method according to an embodiment of the present disclosure. The anti-interference control method may also be applied to the anti-interference control apparatus shown in FIG. 5 or FIG. 6. Performing, according to the location information, anti-interference processing corresponding to the location information in S300 includes, but not limited to, a step S310.

At S310, grip adjustment guidance information and/or three-dimensional beam information is determined according to the location information, and a user is prompted with the grip adjustment guidance information and/or the three-dimensional beam information through the information prompt component.

In an embodiment, after the location information from the interference source detection assembly is acquired, i.e., the location information of the interference source has been determined, the corresponding grip adjustment guidance information and/or three-dimensional beam information can be provided according to the location information, and prompted to the user through the information prompt component, so that the user can perform corresponding adjustment according to the guidance, to eliminate or weaken the interference caused by the interference source.

It should be noted that the anti-interference control method in this embodiment and the anti-interference control apparatus in the foregoing embodiments belong to the same inventive concept, and therefore, for specific implementations of the anti-interference control method in this embodiment, reference may be made to the specific embodiments of the anti-interference control apparatus in the foregoing embodiments. To avoid redundancy, the specific implementations of the anti-interference control method in this embodiment will not be described in detail herein.

Figure 13:
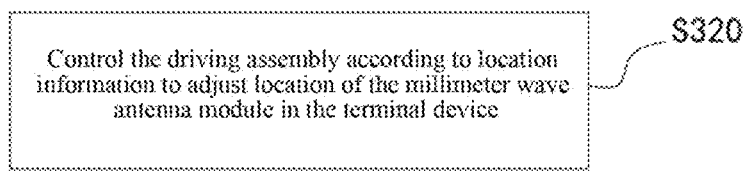
FIG. 13 is a flowchart of an anti-interference control method according to another embodiment of the present disclosure.

As shown in FIG. 13, FIG. 13 is a flowchart of an anti-interference control method according to an embodiment of the present disclosure. The anti-interference control method may also be applied to the anti-interference control apparatus shown in FIG. 7. Performing, according to the location information, anti-interference processing corresponding to the location information" in S300 further includes, but not limited to, a step S320.

At S320, the driving assembly is controlled according to the location information to adjust a location of the millimeter wave antenna module in the terminal device.

In an embodiment, the location of the millimeter wave antenna module in the terminal device can be directly adjusted by the driving assembly, i.e., the relative positions of the millimeter wave antenna module and the interference source can be changed, so as to realize the anti-interference adjustment for the millimeter wave antenna module.

It should be noted that the anti-interference control method in this embodiment and the anti-interference control apparatus in the foregoing embodiments belong to the same inventive concept, and therefore, for specific implementations of the anti-interference control method in this embodiment, reference may be made to the specific embodiments of the anti-interference control apparatus in the foregoing embodiments. To avoid redundancy, the specific implementations of the anti-interference control method in this embodiment will not be described in detail herein.

In addition, an embodiment of the present disclosure further provides a terminal device. The terminal device includes the anti-interference control apparatus in the embodiment shown in FIG. 1 or the anti-interference control apparatus in the embodiment shown in FIG. 8.

The non-transitory software program and instructions required to perform the anti-interference control method of the foregoing embodiments are stored in the memory which, when executed by the processor, cause the processor to perform the anti-interference control method of the foregoing embodiments, for example, perform the method steps S100 to S300 in FIG. 9, the method step S210 in FIG. 10, the method steps S220 to S230 in FIG. 11, the method step S310 in FIG. 12, or the method step S320 in FIG. 13.

It should be noted that the terminal device in this embodiment may be applied to the anti-interference control apparatus in the embodiment shown in FIG. 1 or the anti-interference control apparatus in the embodiment shown in FIG. 8, and these embodiments all belong to the same inventive concept and therefore have the same implementation principle and technical effects, so the details will not be repeated herein.

The apparatus embodiments described above are merely illustrative. The units described as separate components may or may not be physically separated, i.e., they may be located in one place or may be distributed over a plurality of units. Some or all of the modules may be selected according to actual needs to achieve the objects of the scheme of this embodiment.

In addition, an embodiment of the present disclosure further provides a computer-readable storage medium, storing a computer-executable instruction which, when executed by a processor or a controller, for example, by a processor in the embodiment described above, causes the processor to perform the anti-interference control method of the foregoing embodiments, for example, perform the method steps S100 to S300 in FIG. 9, the method step S210 in FIG. 10, the method steps S220 to S230 in FIG. 11, the method step S310 in FIG. 12, or the method step S320 in FIG. 13.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information transfer medium.

An embodiment of the present disclosure includes: an anti-interference control apparatus, including an interference detection assembly connected to a millimeter wave antenna module, an interference source detection assembly connected to the interference detection assembly, and a control assembly connected to the interference source detection assembly. The interference detection assembly is configured for determining, according to a channel quality parameter from the millimeter wave antenna module, whether a millimeter wave signal emitted by the millimeter wave antenna module is interfered. The interference source detection assembly is configured for acquiring location information of an interference source when the interference detection assembly determines that the millimeter wave signal emitted by the millimeter wave antenna module is interfered. The control assembly is configured for performing, according to the location information from the interference source detection assembly, anti-interference processing corresponding to the location information. The terminal device includes the millimeter wave antenna module. The interference detection assembly can determine whether the millimeter wave signal emitted by the millimeter wave antenna module is interfered, so that the anti-interference control apparatus can accurately determine an interference status of the millimeter wave antenna module under current conditions to determine whether anti-interference processing needs to be performed for the millimeter wave antenna module. When it is determined that the millimeter wave signal is interfered, the interference source detection assembly can detect the location information of the interference source, so that the user can learn the cause of the interference with the millimeter wave signal. Then the anti-interference processing corresponding to the location information can be performed based on the control assembly. In other words, anti-interference adjustment can be performed correspondingly according to an actual scenario and application environment, so as to solve the interference caused by the interference source to the millimeter wave signal. Therefore, the anti-interference capability of the millimeter wave antenna module can be improved, and accordingly the throughput performance of the terminal can be further improved.

Although some implementations of the present disclosure have been described above, the present disclosure is not limited to the implementations described above. Those having ordinary skills in the art can make various equivalent modifications or replacements without departing from the scope of the present disclosure. Such equivalent modifications or replacements fall within the scope defined by the claims of the present disclosure.

What is claimed is:

1. An anti-interference control apparatus, arranged in a terminal device comprising a millimeter wave antenna module, the anti-interference control apparatus comprising:
    an interference detection assembly, connected to the millimeter wave antenna module, and configured for determining, according to a channel quality parameter from the millimeter wave antenna module, whether a millimeter wave signal emitted by the millimeter wave antenna module is interfered;
    an interference source detection assembly, connected to the interference detection assembly, and configured for acquiring location information of an interference source in response to the interference detection assembly determining that the millimeter wave signal emitted by the millimeter wave antenna module is interfered; and
    a control assembly, connected to the interference source detection assembly, and configured for performing, according to the location information from the interference source detection assembly, anti-interference processing corresponding to the location information.

2. The anti-interference control apparatus of claim 1, wherein:
    in response to the channel quality parameter from the millimeter wave antenna module being greater than a first channel quality parameter threshold, the interference detection assembly determines that the millimeter wave signal emitted by the millimeter wave antenna module is interfered.

3. A terminal device, comprising a millimeter wave antenna module and the anti-interference control apparatus of claim 2.

4. The anti-interference control apparatus of claim 1, wherein the interference source detection assembly comprises a radiator and a radiation signal detection component connected to the radiator; and
    in response to the interference detection assembly determining that the millimeter wave signal emitted by the millimeter wave antenna module is interfered, the radiation signal detection component emits a radiation signal through the radiator, and in response to acquiring a feedback signal from the radiator, the radiation signal detection component determines the location information of the interference source according to the feedback signal, wherein the feedback signal is obtained from reflection of the radiation signal by the interference source.

5. The anti-interference control apparatus of claim 1, wherein the terminal device further comprises an information prompt component connected to the control assembly; and
    in response to the control assembly acquiring the location information from the interference source detection assembly, the control assembly determines grip adjustment guidance information and/or three-dimensional beam information according to the location information, and prompts a user with the grip adjustment guidance information and/or the three-dimensional beam information through the information prompt component.

6. The anti-interference control apparatus of claim 1, wherein the terminal device further comprises a driving assembly respectively connected to the millimeter wave antenna module and the control assembly; and
    in response to the control assembly acquiring the location information from the interference source detection assembly, the control assembly controls the driving assembly according to the location information to adjust a location of the millimeter wave antenna module in the terminal device.

7. A terminal device, comprising a millimeter wave antenna module and the anti-interference control apparatus of claim 1.

8. An anti-interference control method, which is applied to an anti-interference control apparatus, wherein the anti-interference control apparatus is arranged in a terminal device comprising a millimeter wave antenna module, the anti-interference control apparatus comprises an interference detection assembly and an interference source detection assembly, and the millimeter wave antenna module, the interference detection assembly and the interference source detection assembly are connected in sequence,
    wherein the anti-interference control method comprises:
    controlling the interference detection assembly to acquire a channel quality parameter from the millimeter wave antenna module;
    controlling the interference source detection assembly to acquire location information of an interference source in response to the interference detection assembly determining according to the channel quality parameter that a millimeter wave signal emitted by the millimeter wave antenna module is interfered; and
    acquiring the location information from the interference source detection assembly, and performing, according to the location information, anti-interference processing corresponding to the location information.

9. The anti-interference control method of claim 8, wherein the interference source detection assembly comprises a radiator and a radiation signal detection component connected to the radiator; and
    controlling the interference source detection assembly to acquire location information of an interference source comprises:
    controlling the radiation signal detection component to emit a radiation signal through the radiator; and in response to the radiation signal detection component acquiring a feedback signal from the radiator, controlling the radiation signal detection component to determine the location information of the interference source according to the feedback signal, wherein the feedback signal is obtained from reflection of the radiation signal by the interference source.

10. An anti-interference control apparatus, comprising: a memory, a processor, and a computer program stored in the memory and executable by the processor which, when executed by the processor, causes the processor to perform the anti-interference control method of claim 9.

11. A non-transitory computer-readable storage medium, storing a computer-executable instruction which, when executed by a processor, causes the processor to perform the anti-interference control method of claim 9.

12. The anti-interference control method of claim 8, wherein the terminal device further comprises an information prompt component; and performing, according to the location information, anti-interference processing corresponding to the location information comprises:
   determining grip adjustment guidance information and/or three-dimensional beam information according to the location information, and prompting a user with the grip adjustment guidance information and/or the three-dimensional beam information through the information prompt component.

13. An anti-interference control apparatus, comprising: a memory, a processor, and a computer program stored in the memory and executable by the processor which, when executed by the processor, causes the processor to perform the anti-interference control method of claim 12.

14. A non-transitory computer-readable storage medium, storing a computer-executable instruction which, when executed by a processor, causes the processor to perform the anti-interference control method of claim 12.

15. The anti-interference control method of claim 8, wherein the terminal device further comprises a driving assembly connected to the millimeter wave antenna module; and performing, according to the location information, anti-interference processing corresponding to the location information comprises:
   controlling the driving assembly according to the location information to adjust a location of the millimeter wave antenna module in the terminal device.

16. An anti-interference control apparatus, comprising: a memory, a processor, and a computer program stored in the memory and executable by the processor which, when executed by the processor, causes the processor to perform the anti-interference control method of claim 15.

17. A non-transitory computer-readable storage medium, storing a computer-executable instruction which, when executed by a processor, causes the processor to perform the anti-interference control method of claim 15.

18. An anti-interference control apparatus, comprising: a memory, a processor, and a computer program stored in the memory and executable by the processor which, when executed by the processor, causes the processor to perform the anti-interference control method of claim 8.

19. A terminal device, comprising a millimeter wave antenna module and the anti-interference control apparatus of claim 18.

20. A non-transitory computer-readable storage medium, storing a computer-executable instruction which, when executed by a processor, causes the processor to perform the anti-interference control method of claim 8.

* * * * *